United States Patent
Catalano et al.

(10) Patent No.: US 10,042,622 B2
(45) Date of Patent: Aug. 7, 2018

(54) METHODS AND SYSTEMS OF GENERATING EASE OF USE INTERFACES FOR LEGACY SYSTEM MANAGEMENT FACILITIES

(71) Applicant: International Business Machines Corporation, Armonk, NY (US)

(72) Inventors: Robert P. Catalano, Collegeville, PA (US); Connor T. Hayes, Wappingers Falls, NY (US); Anthony T. Sofia, Hopewell-Junction, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 159 days.

(21) Appl. No.: 15/047,984

(22) Filed: Feb. 19, 2016

(65) Prior Publication Data
US 2017/0242673 A1     Aug. 24, 2017

(51) Int. Cl.
*G06F 9/45*     (2006.01)
*G06F 8/53*     (2018.01)
(Continued)

(52) U.S. Cl.
CPC ............... *G06F 8/53* (2013.01); *G06F 9/541* (2013.01); *G06F 8/30* (2013.01)

(58) Field of Classification Search
None
See application file for complete search history.

(56) References Cited

U.S. PATENT DOCUMENTS 5,923,879 A * 7/1999 Sasmazel ............... G06F 9/465
                                                    707/999.102
6,230,117 B1 * 5/2001 Lymer ..................... G06F 8/30
                                                    703/22

(Continued)

OTHER PUBLICATIONS

IBM Technical Disclosure Bulletin. "Automatic Generation of Assembler Language DSECTs to Match C Structures" vol. e34, No. 108, Mar. 1992, available at , https://priorart.ip.com/IPCOM/000107850>.*

(Continued)

*Primary Examiner* — Matthew J Brophy
(74) *Attorney, Agent, or Firm* — Cantor Colburn LLP; William A. Kinnaman, Jr.

(57) ABSTRACT

Embodiments include methods, and computer system, and computer program products for generating ease of use interfaces for legacy system management facilities (SMF). Aspects include: retrieving an SMF record from an SMF data source through an SMF data interface from a file, over a network or via a real-time API, SMF record having a data control section (DSECT) with code comments for storing a mapping of SMF record defining data structure of SMF record with one or more fields, converting mapping of SMF record into an intermediate format representing mapping of SMF record and corresponding information extracted from the code comments among the one or more fields of SMF record, generating at least one application programming interface (API) in a different computer language using intermediate format, and accessing SMF record using API generated. Different computer language may include Java and intermediate format may include Extensible Markup Language (XML).

17 Claims, 3 Drawing Sheets

(51) Int. Cl.
*G06F 9/54* (2006.01)
*G06F 8/30* (2018.01)

(56) References Cited

U.S. PATENT DOCUMENTS

| | | | |
|---|---|---|---|
| 6,904,598 B2 * | 6/2005 | Abileah | G06F 8/20 |
| | | | 719/313 |
| 6,983,468 B1 * | 1/2006 | Green | G06F 8/38 |
| | | | 703/22 |
| 7,275,079 B2 * | 9/2007 | Brodsky | G06F 9/541 |
| | | | 709/203 |
| 8,131,686 B2 | 3/2012 | Lakashmanachar et al. | |
| 8,448,153 B1 | 5/2013 | Wang | |
| 8,533,689 B2 * | 9/2013 | Thunemann | G06F 9/541 |
| | | | 717/108 |
| 9,063,748 B1 | 6/2015 | Bakale et al. | |
| 9,110,767 B2 * | 8/2015 | Neft | G06F 8/72 |
| 9,471,405 B1 * | 10/2016 | Mor | G06F 9/546 |
| 9,665,352 B2 * | 5/2017 | Neft | G06F 8/34 |
| 2002/0019884 A1 * | 2/2002 | Gungabeesoon | G06F 9/541 |
| | | | 719/310 |
| 2012/0209887 A1 * | 8/2012 | Jones | G06F 17/30289 |
| | | | 707/802 |
| 2014/0013337 A1 * | 1/2014 | Neft | G06F 8/72 |
| | | | 719/314 |
| 2014/0372970 A1 * | 12/2014 | Broussard | G06F 8/30 |
| | | | 717/106 |
| 2015/0193243 A1 * | 7/2015 | Varkhedi | G06F 9/45533 |
| | | | 718/1 |
| 2015/0317133 A1 * | 11/2015 | Neft | G06F 8/72 |
| | | | 719/314 |

OTHER PUBLICATIONS

K. Wolf, "Replacing SAS for SMF reports?" mail-archive, Jun. 21, 2008, p. 1-4.

* cited by examiner

METHODS AND SYSTEMS OF GENERATING EASE OF USE INTERFACES FOR LEGACY SYSTEM MANAGEMENT FACILITIES

BACKGROUND

The present disclosure relates generally to mainframe computing, and more particularly to methods, systems and computer program products of generating ease of use interfaces for legacy system management facilities (SMF).

International Business Machines Corporation's (IBM's) system management facilities (SMF) is a component of IBM's z/OS operating system for mainframe computers, providing a standardized method for writing out records of activity to a file (or data set to use a z/OS term). SMF provides infrastructure that allows for operating system components and applications to allow for full "instrumentation" of all baseline activities running on that IBM mainframe operating system, including input/output (I/O), network activity, software usage, error conditions, processor utilization, instrumentation, security, and performance, etc. This data provides insight to all manner of operating system events and can contain extremely valuable information. Currently there are at least 110 IBM owned SMF record types, some with many subtypes, and 128 records that are available to Independent Software Vendors (ISVs). A few exemplary record types may include: IBM Resource Measurement Facility (RMF), Resource Access Control Facility (RACF), Database 2 (DB2), Customer Information Control System (CICS), WebSphere message queue (MQ), and WebSphere Application Server for z/OS, etc.

SMF record exists in terse raw binary format. On one hand, it is very compact, economical and efficient. On the other hand, the definitions for each of these record types are different, complicated, and difficult to understand. It is desirable to provide access to SMF record through various modern computer languages for novice mainframe software engineers as well data scientists interested in examining the SMF record contents.

Therefore, heretofore unaddressed needs still exist in the art to address the aforementioned deficiencies and inadequacies.

SUMMARY

In an embodiment of the present invention, a method of generating ease of use interfaces for legacy system management facilities may include: retrieving an SMF record from an SMF data source through an SMF data interface from a file, over a network or via a real-time API, the SMF record having a data control section (DSECT) with code comments for storing a mapping of the SMF record defining data structure of the SMF record with one or more fields, converting the mapping of the SMF record into an intermediate format representing the mapping of the SMF record and corresponding information extracted from the code comments among the one or more fields of the SMF record, generating, at least one application programming interface (API) in a different computer language using the intermediate format, and accessing the SMF record using the API generated. In certain embodiments, the different computer language may include JavaScript, C++, C, SQL, R, and Java. The intermediate format may include Generalized Markup Language (GML), Standard Generalized Markup Language (SGML), HyperText Markup Language (HTML), Extensible Hypertext Markup Language (XHTML), and Extensible Markup Language (XML).

In another embodiment of the present invention, a computer system for generating ease of use interfaces for legacy system management facilities may include a processor, and a memory storing computer executable instructions for the computer system. When the computer executable instructions are executed at the processor, the computer executable instructions may cause the computer system to perform: retrieving an SMF record from an SMF data source through an SMF data interface from a file, over a network or via a real-time API, the SMF record having a DSECT with code comments for storing a mapping of the SMF record defining data structure of the SMF record with one or more fields, converting the mapping of the SMF record into an intermediate format representing the mapping of the SMF record and corresponding information extracted from the code comments among the one or more fields of the SMF record, generating at least one API in a different computer language using the intermediate format, and accessing the SMF record using the API generated.

In yet another embodiment of the present invention, a non-transitory computer readable storage medium may store computer executable instructions. When the computer executable instructions are executed by a processor of a computer system, the computer executable instructions may cause the computer system to perform: retrieving an SMF record from an SMF data source through an SMF data interface from a file, over a network or via a real-time API, the SMF record having a DSECT with code comments for storing a mapping of the SMF record defining data structure of the SMF record with one or more fields, converting the mapping of the SMF record into an intermediate format representing the mapping of the SMF record and corresponding information extracted from the code comments among the one or more fields of the SMF record, generating at least one API in a different computer language using the intermediate format, and accessing the SMF record using the API generated.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. It will be appreciated that same thing can be said in more than one way. Consequently, alternative language and synonyms may be used for any one or more of the terms discussed herein, nor is any special significance to be placed upon whether or not a term is elaborated or discussed herein. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "plurality" means two or more. The terms "comprising," "including," "carrying," "having," "containing," "involving," and the like are to be understood to be open-ended, i.e., to mean including but not limited to.

The term computer program, as used above, may include software, firmware, and/or microcode, and may refer to programs, routines, functions, classes, and/or objects. The term shared, as used above, means that some or all code from multiple modules may be executed using a single (shared) processor.

z/OS is a 64-bit operating system for IBM mainframe computers.

"SMF" stands for system management facilities. SMF forms the basis for many monitoring and automation utilities. Each SMF record has a numbered Type (e.g. "SMF 89", or "SMF 120"). SMF Type 89 records indicate software product usage and are used to calculate reduced sub-capacity software pricing.

"DSECT" stands for data control section. DSECT is a high-level identifier for a mapping. A record mapping may be a DSECT, and each section mapping may also be a DSECT.

"RMF" (SMF Type 70 through to 79) stands for resource measurement facilities. RMF records are generally supplemented by SMF Type 30 address space records.

"RACF" (SMF Type 80) stands for Resource Access Control Facility. The SMF Type 80 records are written to record security issues, i.e. password violations, denied resource access attempts, etc. Other security systems such as ACF2 also use the type 80 and 81 SMF records.

"EBCDIC" stands for Extended Binary Coded Decimal Interchange Code.

"XML" stands for Extensible Markup Language.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings FIGS. 1-3, in which certain exemplary embodiments of the present disclosure are shown. The present disclosure may, however, be embodied in many different forms and should not be construed as limited to the embodiments set forth herein; rather, these embodiments are provided so that this disclosure will be thorough and complete, and will fully convey the scope of the disclosure to those skilled in the art.

Figure 1:
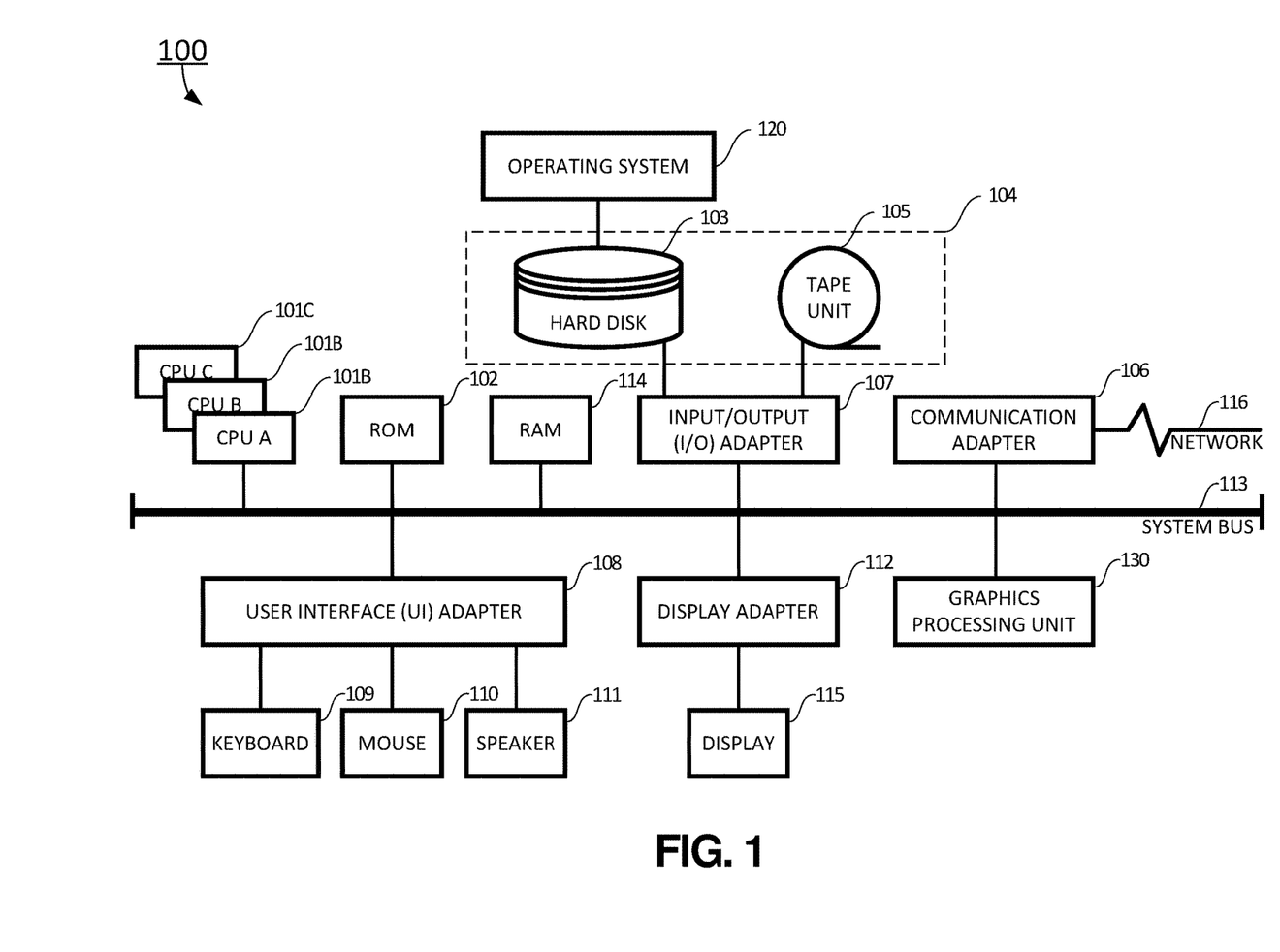
FIG. 1 is a block diagram illustrating an exemplary computer system of generating ease of use interfaces for legacy system management facilities according to certain embodiments of the present invention.

Referring to FIG. 1, an embodiment of a computer system 100 of generating ease of use interfaces for legacy system management facilities and implementing the teachings is shown. In this embodiment, the computer system 100 has one or more central processing units (processors) 101A, 101B, 101C, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of the computer system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the computer system 100 may be stored in mass storage 104. A network adapter 106 interconnects bus 113 with an outside network 116 enabling the computer system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the computer system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the computer system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 1. In certain embodiments, the network 116 may include symmetric multiprocessing (SMP) bus, a Peripheral Component Interconnect (PCI) bus, local area network (LAN), wide area network (WAN), telecommunication network, wireless communication network, and the Internet.

In certain embodiments, the hard disk 103 may be used to store SMF data as an SMF data source. In other embodiments, the SMF data source may be a mass storage facility near a mainframe computer system, and may be accessed through the network 116 as shown in FIG. 1. In certain embodiments, the I/O adapter 107 may be used as an SMF data interface. In other embodiments, other SMF data interfaces may provide SMF data through the network 116, from a file, or via real-time APIs.

SMF is a component of IBM's z/OS for mainframe computers, providing a standardized method for writing out records of activity to a file (or data set to use a z/OS term). The SMF records written by the operating system and applications provide a full "instrumentation" of all baseline activities running on that IBM mainframe operating system, including I/O, network activity, software usage, error conditions, processor utilization, etc. This data provides insight to all manner of operating system events and can contain extremely valuable information. Currently there are at least 110 IBM owned SMF record types, some with many subtypes, and 128 records that are available to Independent Software Vendors (ISVs). A few exemplary record types may include: IBM RMF, RACF, DB2, CICS, WebSphere MQ, and WebSphere Application Server for z/OS, etc.

SMF forms the basis for many monitoring and automation utilities. Each SMF record has a numbered type (e.g. "SMF 70" or "SMF 89"), and installations have great control over how much or how little SMF data to collect. SMF records written by software other than IBM products generally have a record type of 128 or higher. Each SMF record may include a Header/Self-Defining Section that contains the common SMF record headers fields and the triplet fields (offset, length, and number) that locate other sections of the SMF record. Some record types have subtypes—for example, Type 70 Subtype 1 records are written by RMF to record CPU activity. For example, SMF record Type 70, may have a Header/Self-Defining section as shown in TABLE 1, an Individual header extension for subtype 2 as shown in TABLE 2, and an Individual header extension for subtype 2 as shown in TABLE 3 below:

TABLE 1

Header/Self-defining Section for SMF Type 70

| Offsets | | Name | Length | Format | Description |
|---|---|---|---|---|---|
| 0 | 0 | SMF70LEN | 2 | binary | Record length. |
| 2 | 2 | SMF70SEG | 2 | binary | Segment descriptor |
| 4 | 4 | SMF70FLG | 1 | binary | System indicator: |
| | | | | | Bit  Meaning when set |
| | | | | | 0    New record format |
| | | | | | 1    Subtypes used |
| | | | | | 2    Reserved. |
| | | | | | 3-6  Version indicators |
| | | | | | 7    System is running in PR/SM ™ mode |
| 5 | 5 | SMF70RTY | 1 | binary | Record Type 70 (X'46'). |
| 6 | 6 | SMF70TME | 4 | binary | Time since midnight, in 0.01 second |
| 10 | A | SMF70DTE | 4 | packed | Date when the record was moved into buffer |
| 14 | E | SMF70SID | 4 | EBCDIC | System identification |
| 18 | 12 | SMF70SSI | 4 | EBCDIC | Subsystem identification ('RMF'). |
| 22 | 16 | SMF70STY | 2 | binary | Record subtype. |
| 24 | 18 | SMF70TRN | 2 | binary | Number of triplets in this record. |
| 26 | 1A | | 2 | | Reserved. |
| 28 | 1C | SMF70PRS | 4 | binary | Offset to RMF product section. |
| 32 | 20 | SMF70PRL | 2 | binary | Length of RMF product section. |
| 34 | 22 | SMF70PRN | 2 | binary | Number of RMF product sections. |

TABLE 2

Individual header extension for subtype 1 of SMF Type 70
Individual header extension for subtype 1:

| 36 | 24 | SMF70CCS | 4 | binary | Offset to CPU control section from RDW. |
|---|---|---|---|---|---|
| 40 | 28 | SMF70CCL | 2 | binary | Length of CPU control section. |
| 42 | 2A | SMF70CCN | 2 | binary | Number of CPU control section. |
| 44 | 2C | SMF70CPS | 4 | binary | Offset to CPU data section from RDW. |
| 48 | 30 | SMF70CPL | 2 | binary | Length of CPU data section. |
| 50 | 32 | SMF70CPN | 2 | binary | Number of CPU data sections in this record. |

TABLE 2-continued

Individual header extension for subtype 1 of SMF Type 70
Individual header extension for subtype 1:

| 52 | 34 | SMF70ASS | 4 | binary | Offset to ASID Data Area section from RDW |
| 56 | 38 | SMF70ASL | 2 | binary | Length of ASID Data Area section. |
| 58 | 3A | SMF70ASN | 2 | binary | Number of ASID Data Area sections. |
| 60 | 3C | SMF70BCS | 4 | binary | Offset: PR/SM Partition data sect, from RDW |
| 64 | 40 | SMF70BCL | 2 | binary | Length of PR/SM Partition data section. |
| 66 | 42 | SMF70BCN | 2 | binary | Number of PR/SM Partition data sections. |
| 68 | 44 | SMF70BVS | 4 | binary | Offset: PR/SM Logical Processor data section from RDW. |
| 72 | 48 | SMF70BVL | 2 | binary | Length: PR/SM Logical Processor data sect. |
| 74 | 4A | SMF70BVN | 2 | binary | No. PR/SM Logical Processor data sections. |
| 76 | 4C | SMF70CNS | 4 | binary | Offset to CPU-identification name sections. |
| 80 | 50 | SMF70CNL | 2 | binary | Length of CPU-identification name section. |
| 82 | 52 | SMF70CNN | 2 | binary | Number of CPU-identification name sections. |
| 84 | 54 | MF70COS | 4 | binary | Offset to logical core data section from RDW |
| 88 | 58 | MF70COL | 2 | binary | Length of Logical Core data section. |
| 90 | 5A | MF70CON | 2 | binary | Number of Logical Core data sections. |

TABLE 3

Individual header extension for subtype 2 of SMF Type 70
Individual header extension for subtype 2:

| 36 | 24 | SMF7023S | 4 | binary | Offset to Cryptographic CCA Coprocessor data section. |
| 40 | 28 | SMF7023L | 2 | binary | Length of Cryptographic CCA Coprocessor data section. |
| 42 | 2A | SMF7023N | 2 | binary | Number of Cryptographic CCA Coprocessor data sections. |
| 44 | 2C | SMF7024S | 4 | binary | Offset to Cryptographic Accelerator data section. |
| 48 | 30 | SMF7024L | 2 | binary | Length of Cryptographic Accelerator data section. |
| 50 | 32 | SMF7024N | 2 | binary | Number of Cryptographic Accelerator data sections. |
| 52 | 34 | SMF702CS | 4 | binary | Offset to ICSF Services data section. |
| 56 | 38 | SMF702CL | 2 | binary | Length of ICSF Services data section. |
| 58 | 3A | SMF702CN | 2 | binary | Number of ICSF Services data sections. |
| 60 | 3C | SMF7025S | 4 | binary | Offset to Cryptographic PKCS11 Coprocessor data section. |
| 64 | 40 | SMF7025L | 2 | binary | Length of Cryptographic PKCS11 Coprocessor data section. |
| 66 | 42 | SMF7025N | 2 | binary | Number of Cryptographic PKCS11 Coprocessor data sections. |

On z/OS, SMF records provide the ability to have record sections. These sections are described by the triplet of information, at a fixed location, that provides the length of a section (or total length of all sections), the number of sections, and the offset to the first section of the SMF record. Using this system the section can grow or shrink and move around in the record without consuming programs requiring updating.

SMF record exists in terse raw binary format. On one hand, it is very compact, economical and efficient. On the other hand, the definitions for each of these record types are different, complicated, and difficult to understand. When a user has to go through the Header/Self-defining section to find a mapping of data inside the record to access the data. For example, the size of the record is specified by a field SMF70LEN located at the beginning of the SMF record (offset 0). Actual data inside the SMF record may be called product section, and the Header/Self-defining section has three fields (triplets) to indicate where the first production section is located, how long each production section is, and how many product sections there are in the SMF record. The triplets may include: (1) offset to RMF production section (SMF70PRS) located at offset 28, (2) length of RMF production section (SMF70PRL) located at offset 32, and (3) number of RMF production section (SMF70PRN) located at offset 34. In order to access the production data of an SMF Type 70 record, the user may need to first get the SMF70PRN (number) from the Header/Self-defining section, set up an iterative loop to access these production sections, and start to retrieve data from the first production section (SMF70PRS). The retrieval is repeated SMF70PRN times, and each retrieval may retrieve SMF70PRL bytes of data.

In certain embodiments, the SMF Type 70 record may include subtype 1 for storing CPU, Processor Resource/System Manager (PR/SM), and Integrated Coupling Facility (ICF) Activity information, and the subtype 2 for storing Cryptographic Hardware Activity information. The subtype 1 and subtype 2 are defined at offset starting 36. There are seven sets of triplets for subtype 1: (1) CPU control section, (2) CPU data section, (3) address space identifier (ASID) data section, (4) PR/SM Partition data section, (5) PR/SM Logical Processor data section, (6) CPU identification name section, and (7) Logical Core data section. There are four sets of triplets for subtype 2: (1) Cryptographic Common Cryptographic Architecture (CCA) Coprocessor data section, (2) Cryptographic Accelerator data section, (3) Integrated Cryptographic Service Facility (ICSF) data section, and (4) Cryptographic PKCS11 (Public-Key Cryptography Standards) Coprocessor data section.

Each of these formats must be understood by a programmer so that the SMF data can be used. Furthermore, there are more than 120 different SMF record types, and some of these SMF record types have subtypes. Each of the SMF types and subtypes has unique definition. It can be very difficult for a novice programmer to navigate. It is error prone and does not promote programmer productivity. Therefore, it is desirable to provide access to SMF record through various modern languages for new mainframe software engineers as well data scientists interested in examining the record contents.

Figure 2:
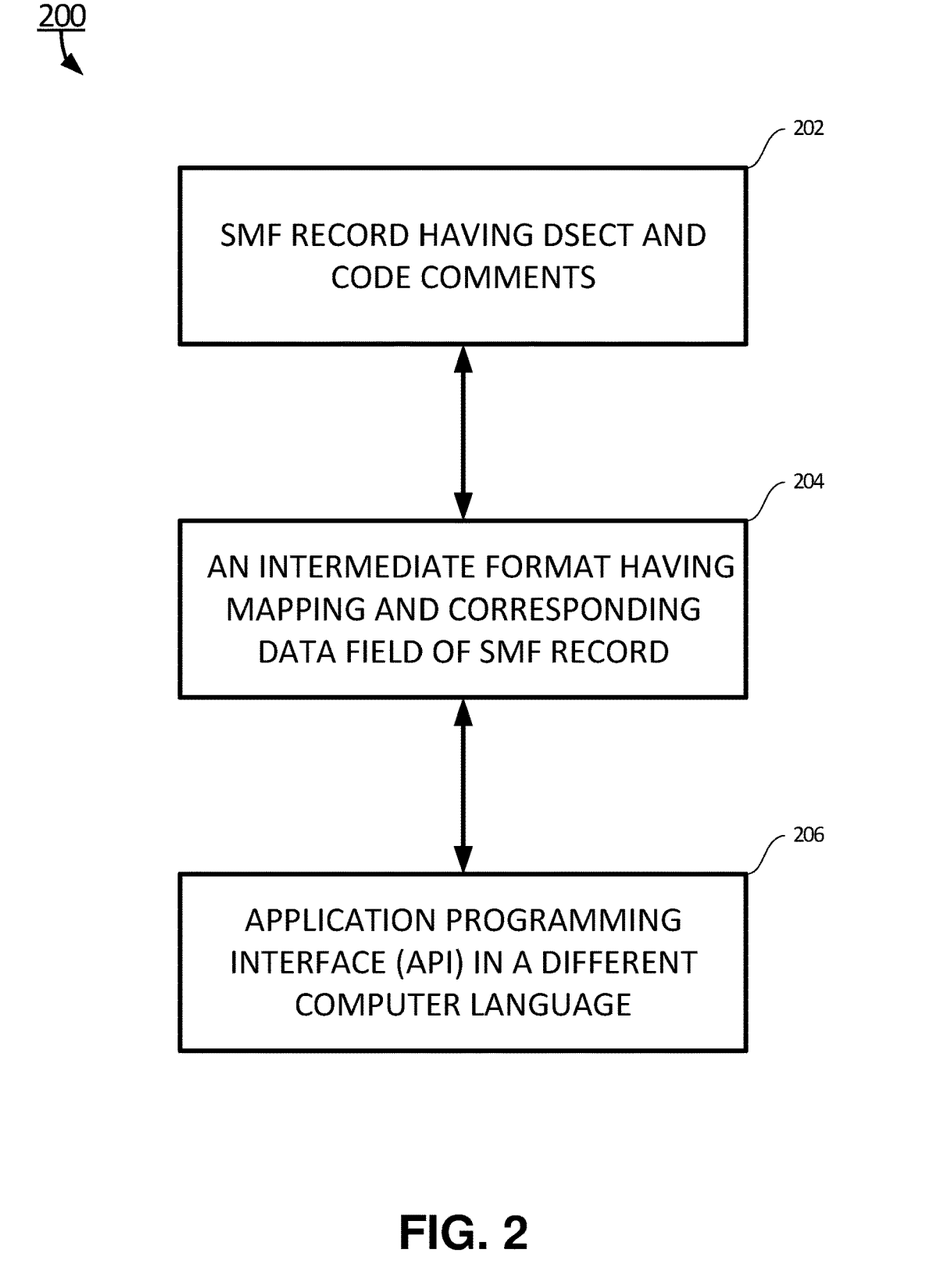
FIG. 2 is a flow chart of data transformation from original SMF data format to a data format that modern computer language can easily access through ease of use interfaces according to certain exemplary embodiments of the present invention.
Figure 3:
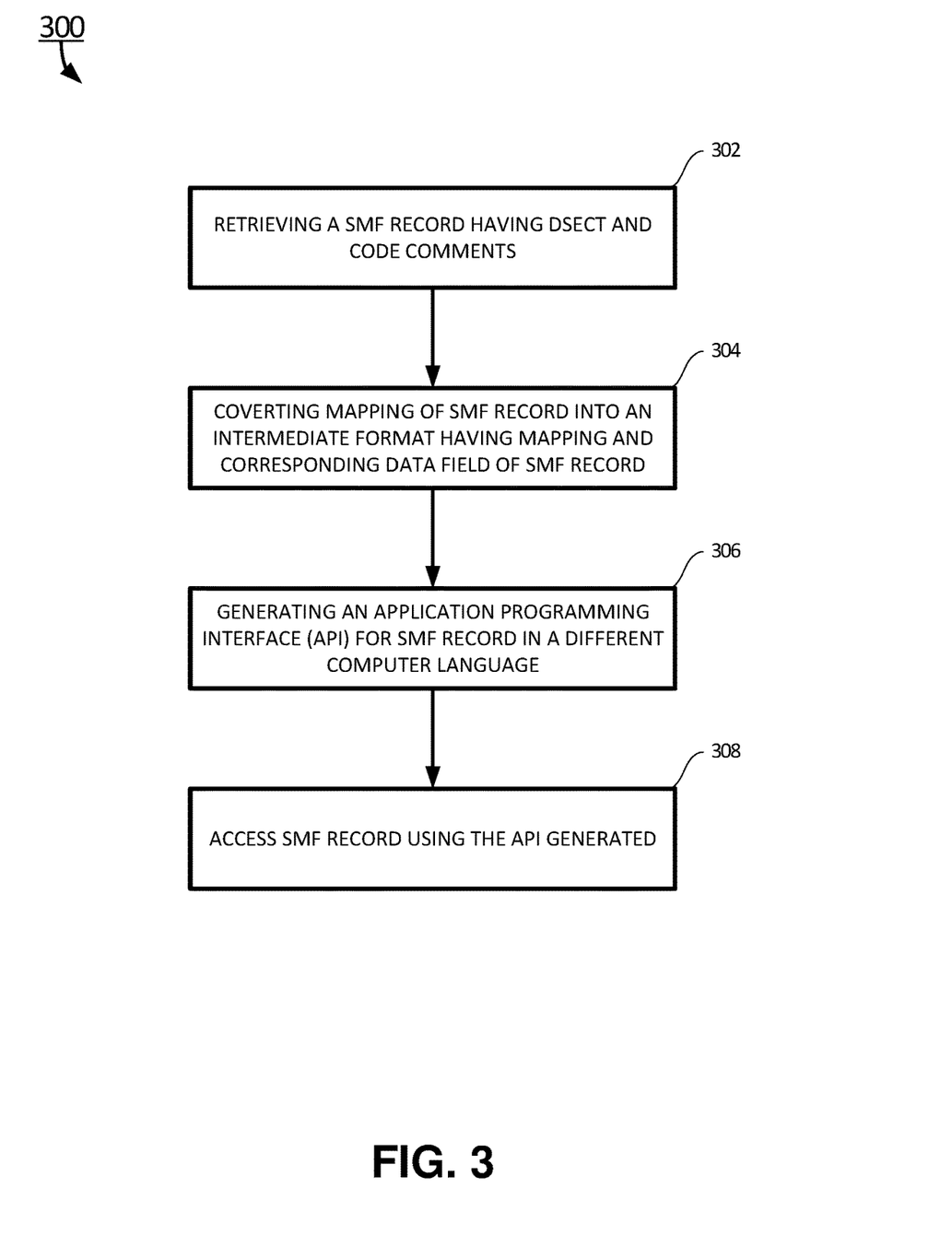
FIG. 3 is flow chart of an exemplary method of generating ease of use interfaces for legacy system management facilities according to certain embodiments of the present invention.

Referring now to FIG. 2, a flow chart illustrating a method 200 of data transformation from original SMF data format to a data format that modern computer language can easily access through ease of use interfaces is shown according to certain exemplary embodiments of the present invention. In certain embodiments, in block 202, SMF record may include a DSECT with code comments where a mapping of the SMF record is defined. The mapping may include a series of fields of varying data types. For example, following types are represented: (1) Integers as signed or unsigned values of 1, 2, 4, or 8 bytes in size, (2) Variables and Fixed length EBCDIC strings, (3) Time values in either STCK (STore ClocK) format or packed decimal format and (4) Flag fields where a 1, 2 or 4 bytes area is mapped into a series of bits of specific meaning. The mapping may include exemplary fields listed in TABLE 1, TABLE2, and TABLE3.

In block 204, the SMF record in block 202 is converted into an intermediate format representing the mapping of the SMF record and corresponding information extracted from the code comments among the one or more fields of the SMF record in block 202.

In block 206, an API is automatically generated for each of the SMF record types in a different computer language such that a novice programmer will be able to access the SMF records using the API without the need to navigate through each byte, each field, and each section of the SMF record.

In one embodiment, the present invention relates to a method of generating ease of use interfaces for legacy system management facilities. Referring now to FIG. 3, a flow chart of an exemplary method 300 of generating ease of use interfaces for legacy system management facilities is shown according to certain embodiments of the present invention.

In block 302, a computer system 100 may retrieve an SMF record from an SMF data source through an SMF data interface from a file, over a network or via a real-time API. The SMF data source may include a mass storage facility of a z/OS computer system, and the hard drive 103 of the computer system 100. The SMF data interface may include the I/O adapter 107 of the computer system 100, and other SMF data interfaces connected through the network 116 to the mass storage facility of the z/OS computer system. The SMF data may include SMF data from a file, or via a real-time API.

In certain embodiments, the SMF record may include a DSECT with code comments that define a mapping of the SMF record, and any sections if the SMF record contains sections. The mapping may include detailed constructs of the SMF record.

In block 304, the computer system 100 may annotate each of the fields in the mapping, and convert the mapping of the SMF record into an intermediate format representing the mapping of the SMF record and corresponding information extracted from the code comments among the one or more fields of the SMF record. The intermediate format forms a base for generating ease of use interfaces for legacy system management facilities. In certain embodiments, the intermediate format may include Generalized Markup Language (GML), Standard Generalized Markup Language (SGML), HyperText Markup Language (HTML), Extensible Hypertext Markup Language (XHTML), and Extensible Markup Language (XML). In certain embodiments, the different computer language may include JavaScript, C++, C, SQL, R, and Java.

In certain embodiments, the annotated intermediate format may also contain corresponding information related to the detailed constructs of the SMF record, but in different computer language. For example, the intermediate format may be Extensible Markup Language (XML), and the different computer language may be Java.

In certain embodiments, the method 300 may use following techniques to convert the SMF record format to the intermediate format: (a) building a set of matching keywords from the header/Self-defining section and code comments of the SMF record. This includes creating wildcard matching, for example, removing vowels from the header/Self-defining section and code comments. Many of DSECTs of the SMF record were created many years ago, and such technique was often used to save characters on a line, (2) weighting different matching keywords, either more heavily or less heavily, for example, the term section would carry a low weight while the term processor would carry a heavier weight, and (3) combining keyword matching and weighting to correctly match the mapping with its associated self-defining fields. The same approach can be used to determine the types of some fields. For example, a set of keywords, corresponding to a time based value, can be searched for in the comments for a given field to determine how the source and destination format should be determined.

In certain embodiments, a single SMF record may contain multiple subtypes. Above XML generation logic may be re-used, and can take an argument that specifies which record type and subtype it should find and employ similar techniques to extract mappings related to that type and subtype into a stand-alone SMF record. In one embodiment, the mapping of the SMF record is translated into an XML format. The XML format is descriptive enough to allow the computer system 100 to generate actual java types, such as java integer, a java time stamp, iterator through java provided by Java 6 or 7, that provide automatic looping capability, such that a lot of data construct can be accessed by matching and using different pattern techniques against code comments in the mapping.

In certain embodiments, context clues of the DSECT with code comments of the SMF record are used to convert the fields in the SMF record to a corresponding field in the different computer language, in this case, Java. For example, if the mapping says this is four byte number, a java integer is a four byte number, so this four byte number may be converted to a java integer by looking at the size of the field, and code comment that says it is a number. Flag field will automatically convert it into a Java Boolean. If this byte indicates it is on/off switches, we will automatically convert it into a Java Boolean. As another example, a string in EBCDIC may include in the comments of the field that it is a string, can be converted automatically to ASCII.

The SMF record may contains one or more sections. There is a fixed position fields to describe where that variable length section is inside of a larger record space. In order to map sections, the computer system 100 may find the section and the mapping for the section that defines the location of the section by leveraging the code comments and fields in the mapping of the SMF record. A few different techniques may be used such as building dictionary of synonyms, weighting different keywords that will match wildcarding, and automatically combining the dictionary of synonyms and keyword matching. Such mapping can't be accomplished with manual matching and mapping. The present invention presents a turnkey solution to convert hundreds and thousands of these mappings without having to do a lot of manual work quickly, and potentially in real time.

In block 306, the computer system 100 may generate at least one API in the different computer language using the intermediate format. In one embodiment, the API is in Java, and the intermediate format is XML. The computer system 100 may generate at least one Java class for each SMF record type. The old binary data structure may be interrogated through the intermediate format by a corresponding Java class without going through the original mappings of the SMF record. The computer system 100 will be able to use the modern programming language, editors, and programming utilities, and use java to leverage the valuable data that is not modernized.

In block 308, once the ease of use API is generated, the computer system 100 may use the API generated to access the SMF record. The method 300 may include: retrieving data from the SMF record using the API generated, processing the data retrieved from the SMF record using the different computer language, and storing the data processed back to the SMF record.

In another embodiment of the present invention, a computer system for generating ease of use interfaces for legacy system management facilities may include a processor, and a memory storing computer executable instructions for the computer system. When the computer executable instructions are executed at the processor, the computer executable instructions may cause the computer system to perform: retrieving a SMF record from an SMF data source through an SMF data interface from a file, over a network or via a real-time API, the SMF record having a DSECT with code comments for storing a mapping of the SMF record defining data structure of the SMF record with one or more fields, converting the mapping of the SMF record into an intermediate format representing the mapping of the SMF record and corresponding information extracted from the code comments among the one or more fields of the SMF record, generating at least one API in a different computer language using the intermediate format, and accessing the SMF record using the API generated.

In yet another embodiment of the present invention, a non-transitory computer readable storage medium may store computer executable instructions. When the computer executable instructions are executed by a processor of a computer system, the computer executable instructions may cause the computer system to perform: retrieving a SMF record from an SMF data source through an SMF data interface from a file, over a network or via a real-time API, the SMF record having a DSECT with code comments for storing a mapping of the SMF record defining data structure of the SMF record with one or more fields, converting the mapping of the SMF record into an intermediate format representing the mapping of the SMF record and corresponding information extracted from the code comments among the one or more fields of the SMF record, generating at least one API in a different computer language using the intermediate format, and accessing the SMF record using the API generated.

The present invention may be a computer system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of generating ease of use interfaces for legacy system management facilities (SMF), comprising:
   retrieving an SMF record from an SMF data source through an SMF data interface from a file, over a network or via a real-time API, wherein the SMF record comprises a data control section (DSECT) with code comments for storing a mapping of the SMF record defining data structure of the SMF record with one or more fields;
   converting the mapping of the SMF record into an intermediate format representing the mapping of the SMF record and corresponding information extracted from the code comments among the one or more fields of the SMF record;
   generating at least one application programming interface (API) in a different computer language using the intermediate format; and
   accessing the SMF record using the API generated,
   wherein the converting comprises:
   building a set of matching keywords from the code comments including wildcard matching;
   weighting different matching keywords; and
   matching the mapping of the SMF record to the intermediate format with one or more corresponding fields by combining the matching keywords, weighting, descriptions and a location of the one or more fields.

2. The method of claim 1, wherein the SMF record comprises one or more sections, and the mapping of the SMF record comprises mapping of the one or more sections.

3. The method of claim 2, wherein the mapping of the one or more sections comprises:
   an offset where a first section is located;
   a size of the one or more sections; and
   a number of the one or more sections.

4. The method of claim 1, wherein the different computer language comprises one or more of:
   JavaScript;
   C++;
   C;
   SQL;
   R; and
   Java.

5. The method of claim 1, wherein the intermediate format comprises one or more of:
   Generalized Markup Language (GML);
   Standard Generalized Markup Language (SGML);
   HyperText Markup Language (HTML);
   Extensible Hypertext Markup Language (XHTML); and
   Extensible Markup Language (XML).

6. The method of claim 1, wherein the accessing the SMF record comprises:
   retrieving data from the SMF record using the API generated;
   processing the data retrieved from the SMF record using the different computer language; and
   storing the data processed back to the SMF record.

7. A computer system for generating ease of use interfaces for legacy system management facilities (SMF) comprising a processor and a memory storing computer executable instructions which, when executed at the processor of the computer system, cause the processor to perform:
   retrieving an SMF record from an SMF data source through an SMF data interface from a file, over a network or via a real-time API, wherein the SMF record comprises a data control section (DSECT) with code comments for storing a mapping of the SMF record defining data structure of the SMF record with one or more fields;
   converting the mapping of the SMF record into an intermediate format representing the mapping of the SMF record and corresponding information extracted from the code comments among the one or more fields of the SMF record;
   generating at least one application programming interface (API) in a different computer language using the intermediate format; and
   accessing the SMF record using the API generated,
   wherein the converting comprises:
   building a set of matching keywords from the code comments including wildcard matching;
   weighting different matching keywords; and
   matching the mapping of the SMF record to the intermediate format with one or more corresponding fields by combining the matching keywords, weighting, descriptions and a location of the one or more fields.

8. The computer system of claim 7, wherein the SMF record comprises one or more sections, and the mapping of the SMF record comprises mapping of the one or more sections.

9. The computer system of claim 8, wherein the mapping of the one or more sections comprises:
- an offset where a first section is located;
- a size of the one or more sections; and
- a number of the one or more sections.

10. The computer system of claim 7, wherein the different computer language comprises one or more of:
- JavaScript;
- C++;
- C;
- SQL;
- R; and
- Java.

11. The computer system of claim 7, wherein the intermediate format comprises one or more of:
- Generalized Markup Language (GML);
- Standard Generalized Markup Language (SGML);
- HyperText Markup Language (HTML);
- Extensible Hypertext Markup Language (XHTML); and
- Extensible Markup Language (XML).

12. The computer system of claim 7, wherein the accessing the SMF record comprises:
- retrieving data from the SMF record using the API generated;
- processing the data retrieved from the SMF record using the different computer language; and
- storing the data processed back to the SMF record.

13. A computer program product operable on a computer system for generating ease of use interfaces for legacy system management facilities (SMF), comprising a non-transitory computer storage medium readable by the computer system having a processor and a memory configured to store computer executable instructions for execution by the processor of the computer system for performing a method comprising:
- retrieving an SMF record from an SMF data source through an SMF data interface from a file, over a network or via a real-time API, wherein the SMF record comprises a data control section (DSECT) with code comments for storing a mapping of the SMF record defining data structure of the SMF record with one or more fields;
- converting the mapping of the SMF record into an intermediate format representing the mapping of the SMF record and corresponding information extracted from the code comments among the one or more fields of the SMF record;
- generating at least one application programming interface (API) in a different computer language using the intermediate format; and
- accessing the SMF record using the API generated, wherein the converting comprises:
- building a set of matching keywords from the code comments including wildcard matching;
- weighting different matching keywords; and
- matching the mapping of the SMF record to the intermediate format with one or more corresponding fields by combining the matching keywords, weighting, descriptions and a location of the one or more fields.

14. The computer program product of claim 13, wherein the SMF record comprises one or more sections, the mapping of the SMF record comprises mapping of the one or more sections, and the mapping of the one or more sections comprises:
- an offset where a first section is located;
- a size of the one or more sections; and
- a number of the one or more sections.

15. The computer program product of claim 13, wherein the different computer language comprises one or more of:
- JavaScript;
- C++;
- C;
- SQL;
- R; and
- Java.

16. The computer program product of claim 13, the intermediate format comprises one or more of:
- Generalized Markup Language (GML);
- Standard Generalized Markup Language (SGML);
- HyperText Markup Language (HTML);
- Extensible Hypertext Markup Language (XHTML); and
- Extensible Markup Language (XML).

17. The computer program product of claim 13, wherein the accessing the SMF record comprises:
- retrieving data from the SMF record using the API generated;
- processing the data retrieved from the SMF record using the different computer language; and
- storing the data processed back to the SMF record.

* * * * *